United States Patent

[11] 3,584,880

[72] Inventor Itsuki Ban
829 Higashi-Oizumimachi Nerima-Ku, Tokyo-to, Japan
[21] Appl. No. 810,216
[22] Filed Mar. 25, 1969
[45] Patented June 15, 1971

[54] TAPE FAST FEED CONTROL APPARATUS
12 Claims, 6 Drawing Figs.

[52] U.S. Cl. 274/4, 226/40, 226/178
[51] Int. Cl. G11b 15/10
[50] Field of Search 226/188, 178, 40; 74/664, 721, 190; 318/11; 274/4

[56] References Cited
UNITED STATES PATENTS

| | | | |
|---|---|---|---|
| 2,118,347 | 5/1938 | Hardenberg | 74/190 X |
| 2,658,398 | 11/1953 | Masterson | 226/178 X |
| 3,385,497 | 5/1968 | Taraborrelli | 226/178 |

*Primary Examiner*—Allen N. Knowles
*Attorney*—Jacobs and Jacobs

ABSTRACT: A tape fast feed control apparatus in an endless magnetic tape cartridge player comprising a rotary drive capstan for driving the tape in the cartridge, an electric motor swingably provided for driving the capstan and having an armature shaft, a first and second speed reducing device having the reduced speed ratio different to each other and for imparting rotation of the motor and the armature shaft, bias means biasing the motor to a first position where the motor is connected to the capstan through the first speed reducing device, actuating means moving the motor from the first position to a second position where the motor is connected to the capstan through the second speed reproducing device, and control means controlling the operation of the actuating means, whereby the tape is normal fed or fast fed in relation to the operation of the control means.

INVENTOR
ITSUKI BAN

BY Jacobs & Jacobs

ATTORNEY

INVENTOR
ITSUKI BAN

BY Jacobs & Jacobs
ATTORNEY

TAPE FAST FEED CONTROL APPARATUS

BACKGROUND OF THE INVENTION

This invention relates to a tape fast feed control apparatus in an endless magnetic tape cartridge player, more particularly to an apparatus for fast feeding the tape a desired length and thereafter changing the tape to normal feed.

A magnetic tape reproducing instrument utilizing an endless magnetic tape cartridge has been widely used due to its simple manipulation, however, a more or less difficulty involves in handling such instrument since fast reverse of the endless magnetic tape cannot be effected. This problem is substantially solved by fast feed. The fast feed of tape is attained by speeding up the rotating speed of a rotary capstan for driving the tape. It is well known that the rotating speed of electric motor for driving the capstan is raised or a reduced speed ratio of a speed reducing device coupling the electric motor to the capstan is used for the purpose of speeding up a rotating speed of capstan. A motor used to this end should be such that at least two speed rotating outputs are obtained and a motor of this class is very expensive. A conventional speed reducing device varying the reduced speed ratio relies upon, for example, a rotary cam, and a vertically movable idler so that complicated structure is required and high quality of manufacture of the device is not easily obtained.

For automation of fast feed, there is considered a method for automatically completing fast feed upon sensing a nonrecord zone between record zones recording song or musical composition provided on one track on the tape or upon lapse of time as predetermined. A currently available tape cartridge provides the tape which is driven at normal speed for about ten seconds so that nonsignal portion may be distinguishably and electrically sensed between record zones. Reproducing sound from a speaker of tape player during tape fast feed is substantially not preferable so that is is essential to apply reproducing signal to the speaker during tape fast feed.

SUMMARY OF THE INVENTION

It is a general object of the invention to provide a tape fast feed control device in the endless magnetic tape cartridge player.

Another object of the invention is to provide a tape fast feed control device in the endless magnetic tape cartridge player wherein a first and second speed reproducing device which have the reduced speed ratio different from each other are independently provided between a rotary drive capstan for driving the tape in the endless magnetic tape cartridge and an armature shaft of an electric motor swingably provided for driving the capstan, the tape being driven at normal speed when the motor is swung to a position where the armature shaft and the capstan are connected through the first speed reproducing device, and the tape being driven at fast speed when the motor is swung to a position where they are connected through the second speed reproducing device.

A further object of the invention is to provide a tape fast feed control device in the endless magnetic tape cartridge player, comprising bias means normally biasing a motor to a first position where a motor armature shaft is connected through the first speed reducing device, actuating means swinging the motor from the first position to a second position where the armature shaft is connected to the capstan through the second speed reproducing device, and control means for controlling the operation of actuating means whereby the fast feed tape is obtained in relation to the operation of control means.

Still another object of the invention is to provide a tape fast feed control apparatus in an endless magnetic tape cartridge player, which is capable of automatically completing tape fast feed upon sensing a predetermined time or length of tape by means of control means.

Yet another object of the invention is to provide a tape fast feed control apparatus, which is capable of automatically completing tape fast feed upon sensing an end mark composed of a nonrecord zone on the tape or conducting means by means of control means.

Still further object of the invention is to provide a tape fast feed control apparatus in an endless magnetic tape cartridge player wherein a first and second speed reducing device are separately provided upwardly and downwardly of a deck seating the tape cartridge and a capstan of shortened length may be available.

Yet further object of the invention is to provide a tape fast feed control apparatus in an endless magnetic tape cartridge player wherein the reproducing signal applied to a speaker during tape fast feed is limited by an electric switch which is opened or closed in relation to the operation of control means.

The foregoing and other objects of the invention may be more clearly understood from the following description when taken in conjunction with the accompanying drawing:

DESCRIPTION OF THE PREFERRED EMBODIMENTS

Figure 1:
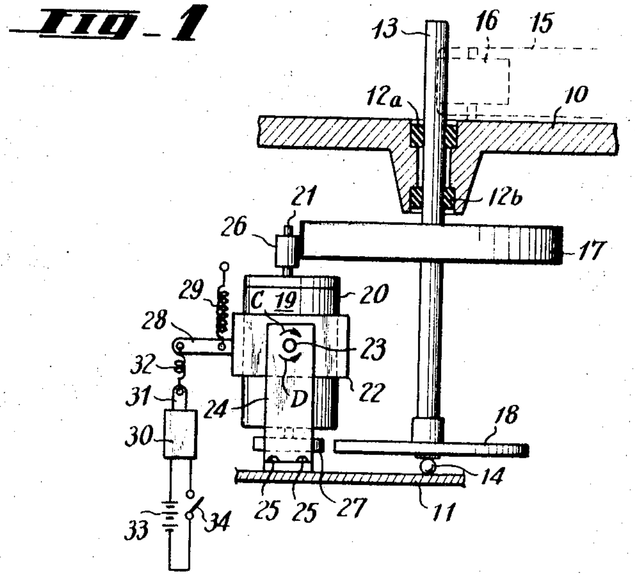
FIG. 1 is a side view of an embodiment of a tape fast feed control apparatus in accordance with the present invention showing a substantial part thereof with partly in section and omitted away.

Referring now to the drawing, and in particularly to FIG. 1, the reference numeral 10 designates a horizontal deck within a housing for an endless magnetic tape cartridge player. A capstan 13 is rotatably mounted by bearings 12*a*, 12*b* provided on the deck 10 and a ball bearing 14 on a bottom plate 11 of the housing. The capstan 13 extends through the bearings 12*a*, 12*b* over the deck 10 and is adapted to cooperate with a pinch roller 16 of an endless magnetic tape cartridge 15 when set in its operating position on the deck 10. A large and small capstan wheel 17 and 18 are fixed in spaced relation to each other on the capstan 13 between the deck 10 and the bottom plate 11. An electric motor 19 is received in a substantially cylindrical frame 22 pivotally mounted by a pin 23 on an upright L-shaped bracket 24 secured by a screw 25 to the bottom plate 11. The electric motor 19 is thus rotatable about the pin 23 in the direction of arrow C or D. An armature shaft 21 of the motor 19 outwardly extends from a motor casing 20 at opposite ends thereof. A small drive wheel 26 is provided on one end of the armature shaft 21 adjacent large capstan wheel 17, and a large drive wheel 27 is in turn provided on the other end of armature shaft 21 adjacent small capstan wheel 18 for a purpose to be hereafter described. A spring 29 is coupled to an arm 28 securely mounted on the frame 22 on the periphery thereof. The motor 19 is normally biased by a spring 29 to a situation in which the small drive wheel 26 engages the large drive wheel 27. A solenoid 30 is secured to the bottom plate 11 for biasing the motor 19 in the direction of arrow D against elasticity of the spring 29. A plunger 31 is reciprocally associated with the solenoid 30 and is connected by a spring 32 to the arm 28. The solenoid 30 is supplied with the power through an electric switch 34 from a direct current electrical source 33. When a normally opened switch 34 is closed in a manner as will be described hereinafter, the plunger 31 will be retracted into the solenoid body and the motor 19 will be swung in the direction of arrow D with the small drive wheel 26 being away from the large capstan wheel 17 and the large drive wheel 27 being engage the small capstan wheel 18. When the solenoid 30 is not energized, rotation of the armature shaft 21 is imparted through the small drive wheel 26 and the large capstan wheel 17 to the capstan 13 to allow the same to be rotated at low speed. At this moment, a tape (not shown) in the cartridge 15 is driven by the capstan 13 and the pinch roller 16 at normal speed. When the solenoid 30 is energized, rotation of the armature shaft 21 is transmitted through the large drove wheel 27 and the small capstan wheel 18 to the capstan 13 to allow the same to speed up for rotation thereof at high speed so that the tape (not shown) is driven at fast speed. It will be understood that the drive wheels 26, 27 and/or the capstan wheels 17, 18 are rubber covered or rubber tired in order to provide a friction drive.

Figure 2:
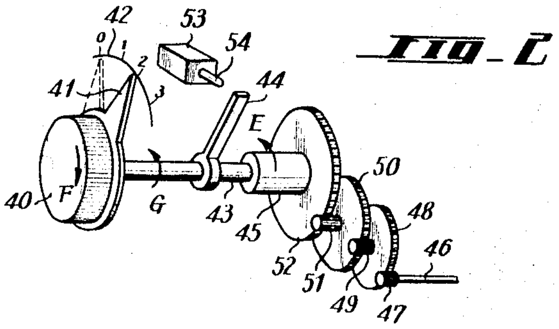
FIG. 2 is a perspective view showing a mechanism controlling a supply of current to the solenoid shown in FIG. 1.

FIG. 2 is illustrated to show means for controlling operation of the switch 34 and fast feed of the endless magnetic tape.

A knob 40 having a pointer 41 is mounted on a rotary shaft 43. The knob projects from a control panel (not shown) of the endless magnetic tape cartridge player (not shown) and the tip end of the pointer 41 faces a scale 42 which is provided on the control panel and includes indicia "0," "1," "2," and "3." A lever 44 is fixed to the rotary shaft 43 and with which a sleeve 45 having a gear 52 is frictionally engaged. The reference numeral 46 is a rotary shaft which is connected by a transmission mechanism (not shown) to the capstan 13 (FIG. 1) and is rotated as the capstan 13 is rotated. Rotation of the rotary shaft 46 is imparted through reduction gear trains 47, 48, 49, 50, 51 and 52 to the sleeve 45 to allow the latter to be rotated in the direction of arrow E. Rotation of the rotary shaft 46 is also imparted through the sleeve 45 to the rotary shaft 43, however, engagement of the lever 44 with an actuator 54 of a microswitch 53 provided within a radius of rotation of the lever 44 admits slippage between the sleeve 45 and the rotary shaft 43 not to impart rotation of the rotary shaft 46 to the rotary shaft 43. The microswitch 53 includes two sets of contact group which are used as the electric switch 34 in FIG. 1 and an electric switch (not shown) for controlling transmission of reproducing signal to a speaker (not shown) of the tape cartridge player. Where the lever 44 operatively depresses the actuator 54 of the microswitch 53, the switch 34 (FIG. 1) is opened to engage the small drive wheel 26 with the large capstan wheel 17. Thus, the capstan 13 is rotated at low speed and the endless magnetic tape (not shown) in the cartridge 15 is driven at normal speed. At this time, the pointer 41 of the knob 41 points as shown by dotted line of FIG. 2 to the digit "0" on the scale.

When the knob 40 is manually rotated in the direction of arrow F to allow the pointer 41 to point to the digit "2" on the scale 42, operation of the microswitch actuator 54 is released to close the electric switch 34 (FIG. 1). The solenoid 30 is energized thereby and the plunger 31 rotates the motor 19 in the direction of arrow D against elasticity of the spring 29. As a result, the large drive wheel 27 engages the small capstan 18 to speed up rotation of the capstan 13 and the endless magnetic tape (not shown) in the cartridge 15 is driven at fast speed. With running of the endless magnetic tape, the rotary shaft 43 is rotated in the direction of arrow G. Upon lapse of time corresponding to the digit "2" on the scale, the lever 44 operatively depresses the actuator 54 of the microswitch 53 to open the electric switch 34. Simultaneously with opening the electric switch 34, the solenoid breaks off the supply of current and the motor 19 is rotated by elasticity of the spring 29 in the direction of arrow C to engage the small wheel 26 with the large capstan wheel 17 whereby the feed speed of the tape (not shown) in the cartridge 15 proves to normal speed. The pointer 41 of the knob 40 at this time is returned to a position pointing to the digit "0" on the scale 42. When the magnetic tape is driven at fast speed, the switch 34 and an electric switch (not shown) incorporated in the microswitch 53 are opened so that the reproducing sound is not generated from the speaker (not shown) of the endless magnetic tape cartridge.

According to means shown in FIG. 2, the fast feed of the tape may be controlled relying on time. It will readily be understood that if the scale is provided with the digits to show the length of the tape rather than the period of time, fast feed of the tape may be controlled by the length of the tape.

Figure 3:
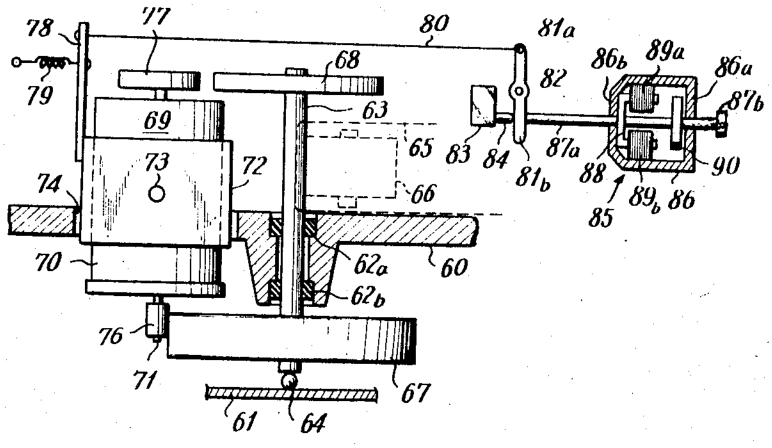
FIG. 3 is a side view of another embodiment of a tape fast feed control apparatus according to the invention showing a substantial part thereof with partly in section and omitted away.

In FIG. 3, there is shown a further embodiment of the tape fast feed control means.

Figure 4:
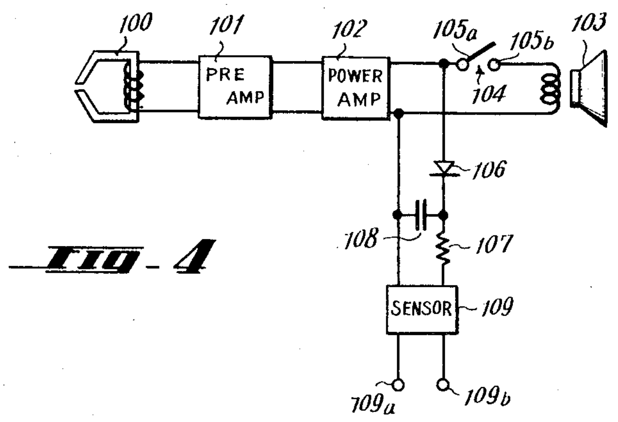
FIG. 4 shows a schematic block diagram constituting a circuit which is used in combination with the apparatus shown in FIG. 3 to sense a nonrecord zone on the tape and generates a signal.

A capstan 63 is rotatably mounted by bearings 62*a*, 62*b* provided on a deck 60 and a ball bearing 64 on a bottom plate 61. The capstan 63 extends through bearings 62*a*, 62*b* over the deck 60 and is adapted to cooperate with a pinch roller 66 of an endless magnetic tape cartridge 65 when a cartridge 65 is set in its operating position on the deck 60. A small capstan wheel 68 is fixed to one end of the capstan 63 above deck and a large capstan wheel 67 is fixed in turn to the other end under the deck. An electric motor 69 is received in a substantially cylindrical frame 72 pivotally mounted by a pin 73 on an upright L-shaped bracket (not shown) fixed to the deck 60. An electric motor 69 and a frame 72 extend through an aperture 74 bored through the deck and project from the deck 60 at opposite ends. The aperture 74 of a circle having larger diameter than that of the frame 72. Accordingly, the motor 69 is clockwise or counterclockwise swung with the frame 72 in the aperture 74 about the pin 73. The armature shaft 71 of the motor 69 outwardly extends from a casing 70 at opposite ends thereof. A small drive wheel 76 is provided on one end of the armature shaft 71 adjacent large capstan wheel 67, and a large drive wheel 77 is provided on the other end of the armature shaft 71 adjacent small wheel 68. A spring 79 is coupled to an upwardly and vertically extending arm 78 formed of leaf spring on the periphery of the frame 72. The motor 69 is normally biased by the spring 79 to the situation where the small drive wheel 76 engages the large capstan wheel 67. At this point, the large drive wheel 77 is spaced away the small capstan wheel 68. The arm 78 is connected at one end by a wire 80 to a link 81 at one end 81*a* thereof. A link 81 is mounted for pivotal movement relative to a stationary bracket (not shown) on the deck 60 by a pivot pin 82. Provided opposed to the other end 81*b* of the link are an actuator 84 of a microswitch 83 secured to a bracket (not shown) on the deck 60 and a pushbutton rod 87*a* of a pushbutton device 85 secured to a bracket (not shown) on the deck 60. The microswitch 83 includes contact groups used as electric switch 104 (FIG. 4). The pushbutton device 85 is comprised of a casing 86, a pushbutton rod 87*a* slidably mounted in a suitably aligned apertures on walls 86*a*, 86*b* of the casing 86, a pushbutton 87*b* provided on one end of the pushbutton 87*a* outwardly extending from the casing 86, electromagnetic means constructed by winding a pair of coils 89*a*, 89*b* to U-shaped core 88 and secured to inside of the walls 86*a*, and a circular steel plate 90 in the casing mounted on the pushbutton so as to be opposed to the open end of magnetic circuit of the core 88. The coil 89*b* of electromagnetic means is normally magnetized by the direct current electrical source (not shown). The coil 89*a* is magnetized by the electrical signal as will be described hereinafter. In energizing the coil 89*a*, the drift of the current to be applied to the coils 89*a*, 89*b* is so determined as to allow the magnetic flux generated when energizing the coil 89*a* to erase the magnetic flux generated from the coil 89*b*. The pushbutton rod 87*b* projects from the control panel (not shown) of the endless magnetic tape cartridge player (not shown) and is adapted to be manually operated. The pushbutton rod 87*a* is normally biased through the link 81, wire 80 and arm 78 by elasticity of the spring 79 to the rightward direction to keep the core 88 away from the steel plate 90. In this state, the actuator 84 of the microswitch 83 is not activated. When the pushbutton rod 87*b* is depressed, the steel plate 90 approaches the open end of the magnetic circuit of the core 88 and the steel plate 90 is attracted to the core 88 by the magnetic flux from the energized coil 89*a*. In this status, the link 81 is depressed by the pushbutton rod 87*a* and is counterclockwise rotated about the pivot pin 82 to operatively depress the actuator 84 of the switch 83 while the motor 69 is clockwise rotated about the pin 73 against elasticity of the spring 79 to engage the large drive wheel 77 with the small capstan wheel 68. The capstan 63 is thus rotated at high speed and the endless magnetic tape in the cartridge 65 is driven at fast speed. Application of electric signal as mentioned hereinafter to the coil 89 substantially deprives the magnetism in electromagnetic means and the steel plate 90 with the pushbutton rod 87*a* is away from the open end of the magnetic circuit of the core 88 by elasticity of the spring 79. When the steel plate 90 is away from the core 88, the operation of the microswitch 83 by the link 81 is released while the large drive wheel 77 is away from the small capstan wheel 68 to engage the small drive wheel 76 with the large capstan wheel 67. The rotating speed of the capstan 63 is thus speed down and the magnetic tape in the cartridge 65 if driven from at fast to normal speed. The apparatus shown in FIG. 3 is constructed so that the small and large capstan wheel 67 are disposed upwardly and downwardly of the deck 60 whereby it is not necessary to require long dimension for the capstan 63 and the endless magnetic tape cartridge player is caused to be flat and compact. The speed ratio of normal tape feed and fast tape feed is determined by selection of the diameter of the capstan wheel 17 and 18, the drive wheel 26 and 27 in case of the apparatus shown in FIG. 1, and the capstan wheel 67 and 68, the drive wheel 76 and 77.

A schematic block diagram shown in FIG. 4 constitutes a sensing circuit for producing the electric signal in response to nonsignal zone between one record and a successive second zone on the tape when the endless magnetic tape is driven at fast speed. The electric signal produced from the sensing circuit is applied to the coil 89*a* (FIG. 3) A magnetic head 100 feeds a preamplifier 101. The output of the preamplifier 101 is applied to a power amplifier 102 which drives a speaker 103. The output of the power amplifier 102 is applied through a movable contact 105*a* and a fixed contact 105*b* of an electric switch 104 to the speaker 103. The output of the power amplifier 102 may also be applied to a rectification circuit comprising a diode 106, resistance 107, and a condenser 108. The output signal, rectified by the rectification circuit, of the power amplifier 102 is applied to a sensor 109. The output signal is not generated in output terminals 109*a*, 109*b* as the input signal exists in the sensor 109 but generated therein as the input signal decays. The sensor 109 is construed, for instance, by the Schmidt circuit. The electric switch 104 is operated in a manner that the movable contact 105*a* and fixed contact 105*b* are closed when the magnetic tape is driven at normal speed and the movable contact 105*a* and fixed contact 105*b* is opened when the magnetic tape is driven at fast speed. That is to say, the movable contact 105*a* and fixed contact 105*b* are opened where the microswitch 83 (FIG. 3) is operated by the link 81 (FIG. 3). The coil 89*a* is connected to the output terminals 109*a*, 109*b* of the sensor 109. While the record zone on the driving tape feeds through the magnetic head 100, the rectified reproducing signal is applied to the sensor 109 but the output signal is not produced in the output terminals 109*a*, 109*b*. The nonrecord zone on the tape passes through the magnetic head 100 to deprive the reproducing signal. As a result, the input signal of the sensor 109 decays upon lapse of time lag determined by a resistance 107 and the condenser 108. The output electric signal is thus produced in the output terminals 109*a*, 109*b*. This output electric signal is applied to the coil 89*a* (FIG. 3) to magnetize the coil 89*a*. When the magnetic tape is driven at normal speed, since the steel plate 86 is away from the core 88, the pushbutton device 85 (FIG. 3) is not substantially actuated even though the coil 89*a* is excited. This enables the magnetic tape to successively be driven at normal speed. Where the magnetic tape is driven at fast speed by depressing the pushbutton rod 87 of the pushbutton device 85, the magnetic flux generated by exciting the coil 89*a* deprives the magnetic flux produced from the coil 89*a* to cause the core 88 to lose magnetic attraction to the steel plate 90. Accordingly, the pushbutton 87*b* with the pushbutton rod 87*a* and the steel plate 90 are returned to their original position by elasticity of the spring 79 to allow the magnetic tape to be converted from fast to normal feed.

As described hereinbefore, by combining the apparatus shown in FIG. 3 with the sensing circuit illustrated in FIG. 4, the tape driven at fast speed is caused to correspond to the nonrecord zone on the tape and is changed to normal speed. So long as the tape is driven at fast speed, the microswitch (FIG. 3) is operated by the link 81 so that the movable contact 105*a* (FIG. 4) and the fixed contact 105*b* (FIG. 4) are opened not to produce the reproducing sound from the speaker 103. The time lag determined by the resistance 107 and the condenser 108 should be lesser period than that requires to allow the nonrecord zone on the tape which is driven at fast speed to pass through the magnetic head.

Figure 5:
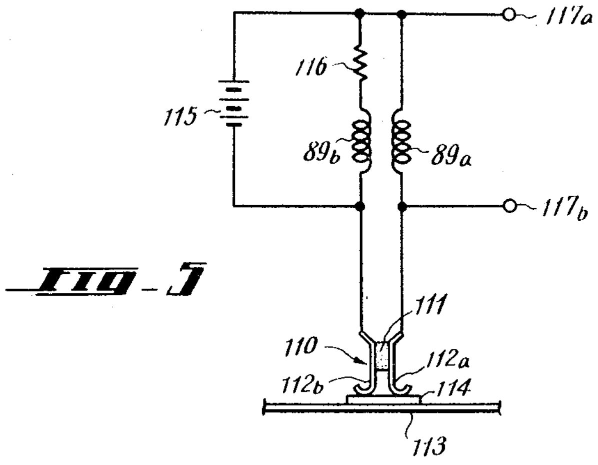
FIG. 5 is a diagram showing a circuit used in combination with the apparatus shown in FIG. 3 to sense an end mark provided on the magnetic tape.

In FIG. 5, there is illustrated a sensing circuit used for exciting the coil 89*a* of the pushbutton device 85 of FIG. 3 in response to an end mark of a conducting foil provided on the endless magnetic tape.

The reference numeral 110 denotes a switch head which has a pair of electrical conducts 112*a*, 112*b* each insulated by an insulator member 11 and engages the magnetic tape as in the same manner of the magnetic head. The electrical conducts 112*a*, 112*b* is short-circuited by an end mark 114 of a conducting foil provided on the magnetic tape 13. The coil 89*b* of the electromagnetic means of which details has been described with respect to FIG. 3 is connected in series with a electrical source. The coil 89*a* is also connected through the switch head 110 in series with the electrical source 115. The coil 89*b* is always supplied with the current by the electrical source 115 while the coil 89*a* is, however, supplied with the current by a source 115 only when the electrical conducts 112*a*, 112*b* of the switch head 110 is short-circuited by the end mark 14. The short circuit of the electrical conducts 112*a*, 112*b* automatically completes the fast feed of magnetic tape. It will be readily understood that the tape feed is effected at normal speed as clearly described in the foregoing. When terminals 117*a*, 117*b* of the coil 89*a* (FIG. 5) are each connected to the respective output terminals 109*a*, 109*b* of the sensor 109 shown in FIG. 4, the tape fast feed is automatically controlled in response to the end mark 114 on the tape and the nonrecord zone on the tape.

Figure 6:
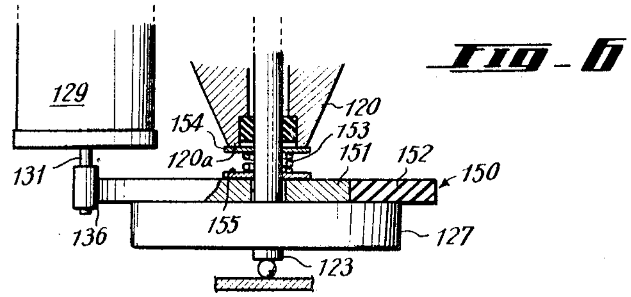
FIG. 6 is a side view of a preferred speed reducing device in the tape fast feed control apparatus according to the present invention, with partly in section and omitted away.

FIG. 6 shows a preferred mechanism for imparting rotation of the electric motor to the capstan. In the instance illustrated in FIG. 3, the small drive wheel 76 abuts against the large capstan wheel 67 upon completion of the magnetic tape fast feed, and reverse rotation is imparted to the armature shaft 71 of the electric motor 69 so that the same is subject to the impact.

A mechanism as shown in FIG. 6 serves to relieve the motor of such impact. Loosely mounted on a capstan 123 firmly carrying a large capstan wheel 127 is a wheel 150 which is of a metal portion 151 and a rubber portion 152. The capstan 123 also loosely carries collars 154, 155, the collar 154 abutting against a deck 120 at a portion 120*a* thereof. A spring 153 interposed between the collars 154, 155 urges the wheel 150 against the large capstan wheel 127 to establish a frictional engagement of the two wheels. A small drive wheel 136 is secured to an armature shaft 131 of the motor 129 to engage the periphery of the rubber portion 152 of the wheel 150. When the magnetic tape running is varied from fast to normal feed, that is, the small drive wheel 76 engages the wheel 150, there exists slippage between the wheel 150 and the large capstan wheel 127. This absorbs reverse rotation imparting to the armature shaft 131 of the motor 129 to relieve the motor of the impact.

The invention and its attendant advantages will be understood from the foregoing description. It is to be understood that changes and variations may be made without departing from the spirit and scope of the invention as defined in the appended claims.

I claim:

1. A tape fast feed control apparatus for an endless magnetic tape cartridge player, including a magnetic tape reproducing circuit incorporating a magnetic head, a tape drive device for driving the endless magnetic tape in said cartridge, and a deck seating said cartridge, said tape drive device including a rotatable capstan extending from said deck for driving the tape in the cartridge, an armature shaft for driving said capstan, a pivotally movable electric motor for driving said armature shaft, the ends of the armature shaft projecting from opposite sides of the motor body, a speed reducing device provided at each end of said armature shaft independent of each other and having a reduced speed ratio different from each other for imparting rotation of said armature shaft of said motor to said capstan, bias means biasing said motor to a first position where said motor is connected to said capstan through one of said speed reducing devices, said tape being driven at normal speed by said capstan when said motor is biased to said first position, actuating means pivotally moving said motor from said first position to a second position where said motor is connected to said capstan through the other of said speed reducing devices, said tape being driven at fast speed when said motor is moved to said second position, and control means for controlling the operation of said actuating means, said tape being normally or fast fed in relation to the operation of said control means.

2. A tape fast feed control apparatus in an endless magnetic tape cartridge player in accordance with claim 1 wherein said motor is swingably pivoted at the midportion of its motor body.

3. A tape fast feed control apparatus in an endless magnetic tape cartridge player in accordance with claim 2 wherein said first speed reducing device comprises a small drive wheel provided on said armature shaft at one end thereof and a large capstan wheel on said capstan which is adapted to be connected to said small drive wheel when said motor is in said first position, and said second speed reducing device comprises a large drive wheel provided on said armature shaft at the other end thereof and a small capstan wheel on said capstan which is adapted to be connected to said large drive when said motor is in said second position.

4. A tape fast feed control apparatus in an endless magnetic tape cartridge player in accordance with claim 3 wherein said actuating means is a solenoid having a plunger connected to said motor.

5. A tape fast feed control apparatus in an endless magnetic tape cartridge player in accordance with claim 4 wherein said control means is incorporated in a group of contacts controlling a supply of current to said solenoid and said tape reproducing circuit, said controlling means comprising electrical switch means having a group of contacts controlling production of reproducing sound, a lever for operating said electrical switch means, and a rotary shaft adapted to be rotated in relation to rotation of said capstan and firmly carrying said lever rotatable by manual operation, said rotary adapted to be manually rotated, whereby said tape being fast fed by moving said lever to a noneffective position deactuating said electrical switch while production of reproducing sound from said tape reproducing circuit is cut off, and said tape being normally fed by returning said lever to an effective position operating said switch.

6. A tape fast feed control apparatus in an endless magnetic tape cartridge player in accordance with claim 3 wherein said actuating means comprises a link swingably pivoted and connected to said motor, a manually operable push button rod, a steel plate secured to said pushbutton rod, and electromagnetic means spacedly provided opposed to said steel plate, said motor being adapted to be moved through said link to said second position by depressing said pushbutton rod, said steel plate being positioned to be engaged with said electromagnetic means when said pushbutton rod is depressed, said electromagnetic means being adapted to release engagement of said steel plate in response to said control means.

7. A tape fast feed control apparatus in an endless magnetic tape cartridge player in accordance with claim 6 wherein said link of said actuating means is provided opposed to an electrical switch which is incorporated in said tape reproducing circuit, said switch being adapted to control production of reproducing sound, said electric switch being adapted to cut off production of reproducing sound from said tape reproducing circuit when said link is rotated by depressing said pushbutton lever.

8. A tape fast feed control apparatus in an endless magnetic tape cartridge player in accordance with claim 6 wherein said electromagnetic means comprises a core having an open end opposed to said steel plate, a first coil provided on said core, a source of current for said first coil, said first coil current being controlled by said control means, and second coil provided on said core, said second coil being always supplied with current, said coils being arranged such that the magnetic flux generated in said first coil mutually deprives the magnetic flux produced in said second coil.

9. A tape fast feed control apparatus in an endless magnetic tape cartridge player in accordance with claim 8 wherein said control means includes sensing means for producing an electrical signal in response to a nonrecord zone between one record zone and next record zone on the tape, and means for applying the output of said sensing means to said first coil of said electromagnetic means.

10. A tape fast feed control apparatus in an endless magnetic tape cartridge player in accordance with claim 8 wherein said control means includes a switch head having two electrical conducts adapted to be short-circuited by an end mark of a conducting foil on the tape and an electrical source for energizing said second coil of said electromagnetic means, said switch head being connected in series with said electrical source and said second coil.

11. A tape fast feed control apparatus in an endless magnetic tape cartridge player in accordance with claim 2 wherein said motor extends above and below said deck, said speed reducing devices being each provided above and below said deck.

12. A tape fast feed control apparatus in an endless magnetic tape cartridge player in accordance with claim 3 wherein a rubber covered wheel is loosely mounted on said surface in frictional engagement, surface-to-surface, with said large capstan wheel of said first speed reducing device and said small drive wheel is connected through said rubber covered wheel to said large capstan wheel.